(12) United States Patent
Abura et al.

(10) Patent No.: US 8,718,222 B2
(45) Date of Patent: May 6, 2014

(54) APPARATUS AND METHOD FOR REINFORCING JET PUMP RISER

(75) Inventors: Masakazu Abura, Yokohama (JP); Toshihiro Yasuda, Yokohama (JP); Kazuo Sudo, Yokohama (JP); Haruhiko Hata, Yokohama (JP); Yasushi Kanazawa, Yokohama (JP); Kunihiko Kinugasa, Yokohama (JP); Hajime Mori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 493 days.

(21) Appl. No.: 11/839,745

(22) Filed: Aug. 16, 2007

(65) Prior Publication Data

US 2008/0205578 A1 Aug. 28, 2008

(30) Foreign Application Priority Data

Aug. 17, 2006 (JP) ................ P2006-222603

(51) Int. Cl.
| | | |
|---|---|---|
| *G21C 23/00* | (2006.01) | |
| *G21C 9/00* | (2006.01) | |
| *G21C 15/00* | (2006.01) | |
| *G21C 19/28* | (2006.01) | |
| *G21C 19/00* | (2006.01) | |
| *F16L 17/00* | (2006.01) | |
| *F16L 33/16* | (2006.01) | |
| *F16L 43/00* | (2006.01) | |
| *F16L 21/00* | (2006.01) | |
| *F16L 3/00* | (2006.01) | |
| *F16L 3/08* | (2006.01) | |

(52) U.S. Cl.
USPC ........... 376/372; 376/260; 376/262; 376/277; 376/285; 376/286; 285/104; 285/111; 285/112; 285/135.2; 285/236; 248/62; 248/67; 248/67.7; 248/74.1

(58) Field of Classification Search
USPC ................ 376/260, 262, 277, 285, 286, 372; 285/104, 111, 112, 135.2, 236; 248/62, 248/67, 67.6, 74.1
See application file for complete search history.

(56) References Cited

U.S. PATENT DOCUMENTS

| | | | | |
|---|---|---|---|---|
| 1,359,127 A | * | 11/1920 | Tedder | ............................ 73/637 |
| 2,412,394 A | | 12/1946 | Giles | |
| 2,440,864 A | | 5/1948 | Liss | |
| 4,461,498 A | | 7/1984 | Kunsman | |
| 4,515,018 A | * | 5/1985 | Kajiyama | ........................ 73/637 |
| 5,735,551 A | | 4/1998 | Whitman et al. | |
| 6,053,652 A | | 4/2000 | Deaver et al. | |

(Continued)

FOREIGN PATENT DOCUMENTS

| | | |
|---|---|---|
| JP | 10-186080 | 7/1998 |
| JP | 11-326586 | 11/1999 |

*Primary Examiner* — Jack W Keith
*Assistant Examiner* — Frank J McGue
(74) *Attorney, Agent, or Firm* — Oblon, Spivak, McClelland, Maier & Neustadt, L.L.P.

(57) ABSTRACT

An apparatus for reinforcing a jet pump riser includes: an elbow upper clamp for covering a riser elbow coupled to a thermal sleeve from an upper side thereof; an elbow lower clamping member for clamping the riser elbow from a lower side thereof; an elbow vertical portion clamping member for covering a vertical portion of the riser elbow; and an elbow horizontal portion clamping member for covering a horizontal portion of the riser elbow. These members are disposed in different orientations with respect to the elbow upper clamp so as to fix the thermal sleeve, the riser elbow and the riser pipe.

10 Claims, 6 Drawing Sheets

(56) References Cited

U.S. PATENT DOCUMENTS

| | | | |
|---|---|---|---|
| 6,108,391 A * | 8/2000 | Deaver et al. | 376/262 |
| 6,264,203 B1 | 7/2001 | Weems et al. | |
| 2005/0247754 A1 * | 11/2005 | Butler | 228/44.5 |

* cited by examiner

APPARATUS AND METHOD FOR REINFORCING JET PUMP RISER

BACKGROUND OF THE INVENTION

1. Field of The Invention

The present invention relates to an apparatus and a method for reinforcing a jet pump riser for preventing occurrence of a weld line crack of a jet pump riser fixed by being welded to an inside of a reactor pressure vessel of a boiling water reactor for preventing development of the crack that has occurred and for maintaining a function at the time of rupture of the weld line.

2. Related Art

Jet pumps in a boiling water reactor are disposed at an annular portion (downcomer portion) between a core shroud of a reactor pressure vessel (RPV) and an RPV inner wall and coupled to a recirculation system to circulate a coolant to a rector core.

With reference to FIG. 10, a structure around the jet pump in the reactor pressure vessel 1 will be described schematically.

As shown in FIG. 10, the jet pump 1a includes a riser 10a, an inlet mixer 9, a diffuser 13, and the like. The riser 10a includes a riser pipe 10 provided perpendicularly to one end of a riser elbow 11 connected to a recirculation nozzle 8, and the riser pipe 10 is fixed to the riser elbow 11 by means of welding. Furthermore, a transition piece 14 is fixed by means of welding to an upper end portion of the riser elbow 11. The other end of the riser elbow 11 is fixed by means of welding to a thermal sleeve 12 of the RPV recirculation inlet nozzle 8.

The riser elbow 11 of the inlet mixer 9 is placed on and fixed by a hold-down bolt to an upper surface of the riser 10a. The inlet mixer 9 is assembled by welding the riser elbow 11, a mixing nozzle 15 and a nozzle throat 16, and a lower end of the nozzle throat 16 is inserted into an upper end of the diffuser 13.

The diffuser 13 is assembled by welding an annular member to a lower portion of a flared cylinder and a lower end of the diffuser 13 is fixed by means of welding to a shroud support plate 5.

Driving fluid with its pressure increased by a recirculating pump, not shown, provided outside the reactor pressure vessel 1 is supplied from the recirculation inlet nozzle 8 into the jet pump 1a and forced to circulate from the riser 10a to the reactor core via the inlet mixer 9 and the diffuser 13.

In the reactor having the above structure, fluid oscillation occurs due to a flow of a large quantity of cooling water sent in from the recirculating pump, and stress repeatedly acts on the jet pump 1a.

Further, during the operation, stress due to a pressure difference between the inside and outside and a large quantity of heat at a reactor core portion occur, and a thermal stress acts on the jet pump.

Because of the stress applied repeatedly due to the fluid oscillation, the pressure difference and the thermal stress, fatigue cracks may occur at the welded portion between the riser elbow 11 and the thermal sleeve 12, and the welded portion between the riser elbow 11 and the riser pipe 10.

Further, cracks may be produced by the stress corrosion crack that occurs in a sensitized region of a welding heat-affected zone.

By continuing the operation of the reactor, the crack may develop to rupture the welded portion in extreme cases. As a result, it may be difficult to maintain a function of sending the fluid (water) into the reactor core of the jet pump, which provides an inconvenience from a viewpoint of safely maintaining operation of the reactor.

As prior art, there are disclosed a method in which vicinities of welded portions of the riser elbow 11, the riser pipe 10, and the thermal sleeve 12 are clamped with clamps and both the clamps are coupled, for example (see Japanese Patent Application Laid-open No. 10-206587: Patent Publication 1), a method in which a vicinity of the welded portion between the riser elbow 11 and the thermal sleeve 12 is clamped, and reaction force of the driving fluid flowing inside from the recirculation inlet nozzle 8 is received by a core shroud 7 (see Japanese Patent Application Laid-open No. 10-186080: Patent Publication 2, for example), and the like.

In the technique in the above-described Patent Publication 1, the clamps are linearly fastened to each other and, if a weld line ruptures and twist force is applied, for example, the ruptured portion opens and it may become impossible to maintain the function of the jet pump 1a.

In the technique in the Patent Publication 2, the riser elbow 11 is restrained by the core shroud 7 in a horizontal direction, and there is also proposed a method of supporting the riser elbow 11 on the diffuser 13 depending on the status of implementation. These methods may complicate behavior of oscillation applied to the jet pump 1a and also exert undesirable influence on the welded portion between the diffuser 13 and the shroud support plate 5.

SUMMARY OF THE INVENTION

The present invention was conceived in consideration of the circumstances mentioned above, and an object of the present invention is to provide an apparatus and a method for reinforcing a jet pump riser for preventing occurrence of a crack, for preventing development of the crack that has occurred, and for maintaining a function of the jet pump riser even in the unlikely event that the crack develops and a jet pump is damaged by mounting the apparatus to the jet pump riser in which the crack is found in a welded portion.

In order to achieve the above object, the present invention provides an apparatus for reinforcing a jet pump riser disposed in a reactor pressure vessel of a boiling water reactor, comprising:

an elbow upper clamp for covering a riser elbow of a jet pump riser and coupled to a thermal sleeve from an upper side thereof;

an elbow lower clamping member for clamping the riser elbow from a lower side thereof;

an elbow vertical portion clamping member for covering a vertical portion of the riser elbow; and an elbow horizontal portion clamping member for covering a horizontal portion of the riser elbow, wherein the elbow lower clamping member, the elbow vertical portion clamping member and the elbow horizontal portion clamping member are disposed in different orientations with respect to the elbow upper clamp so as to fix the thermal sleeve, the riser elbow and the riser pipe.

In a preferred embodiment, it may be desired that the elbow lower clamping member, the elbow vertical portion clamping member and the elbow horizontal portion clamping member are formed as a foldable integral structure which includes a plurality of clamping members.

It may be desired that the elbow lower clamping member, the elbow vertical portion clamping member and the elbow horizontal portion clamping member are formed as a plurality of U-shaped members separated from each other.

It may be desired that the elbow lower clamping member, the elbow vertical portion clamping member and the elbow horizontal portion clamping member are formed as a plurality of ring-shaped members separated from each other.

It may be desired that at least one of the elbow upper clamp, the elbow lower clamping member, the elbow vertical portion clamping member and the elbow horizontal portion clamping member has a movement restricting structure by fitting between recessed and protruded portions with respect to an outer peripheral surface of the riser elbow.

In another aspect to achieve the above object, the present invention provides a method for reinforcing a jet pump riser, comprising the steps of:

disposing an apparatus for reinforcing the jet pump riser into a reactor pressure vessel of a boiling water reactor, the apparatus including: an elbow upper clamp for covering the riser elbow of a jet pump riser coupled to the thermal sleeve from an upper side thereof; an elbow lower clamping member for clamping the riser elbow from a lower side thereof; an elbow vertical portion clamping member for covering a vertical portion of the riser elbow; and an elbow horizontal portion clamping member for covering a horizontal portion of the riser elbow, in a state that the elbow lower clamping member, the elbow vertical portion clamping member, and the elbow horizontal portion clamping member are disposed in different orientations with respect to the elbow upper clamp; and fixing a thermal sleeve, a riser elbow and a riser pipe.

According to the present invention described above, by mounting the reinforcing apparatus to the jet pump riser in which it is determined that the crack may occur in a welded portion or the crack is found in the welded portion, it is possible to prevent the crack from occurring or to prevent development of the crack that has occurred. In addition, even in the unlikely event that the crack develops and the jet pump is damaged, it is possible to maintain a function of the jet pump riser

DESCRIPTION OF THE PREFERRED EMBODIMENTS

Figure 1:
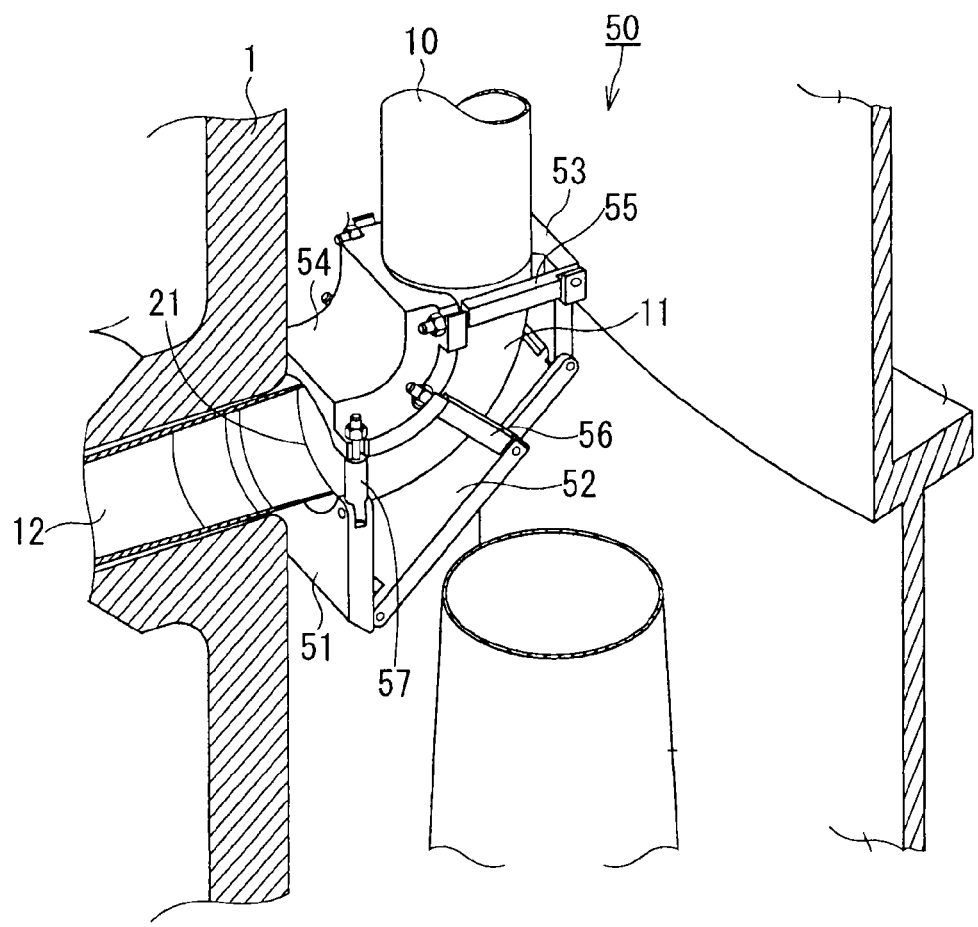
FIG. 1 is a perspective view showing a mounted state of a clamp according to a first embodiment of the present invention.

Preferred embodiments of an apparatus and a method for reinforcing a jet pump according to the present invention will be described hereunder with reference to FIGS. 1 to 9. Further, a structure of the jet pump itself will be described with reference to FIG. 10. In the following description, it should be understood that words indicating directions such as upper, lower, left, and right are words used with reference to illustrated states in the drawings or actual installed states.

First Embodiment (FIGS. 1 to 4)

Figure 2:
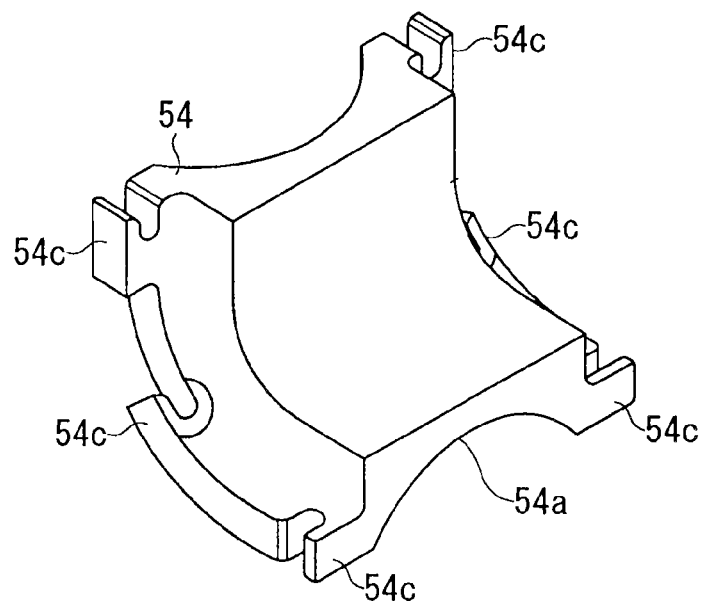
FIG. 2 is a perspective view showing an upper side clamp according to the first embodiment of the invention.
Figure 3:
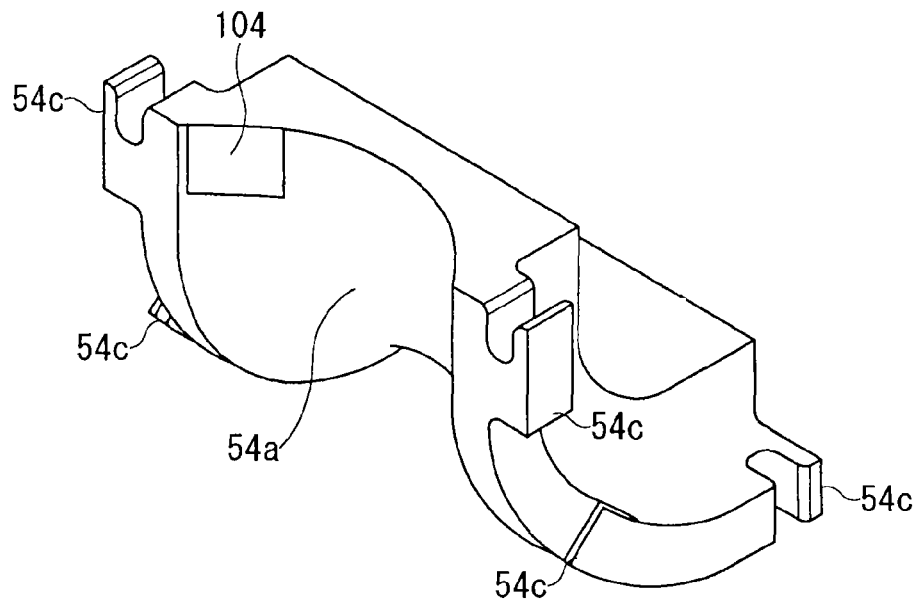
FIG. 3 is a perspective view showing the upper side clamp according to the first embodiment of the invention viewed from a different angle.
Figure 4:
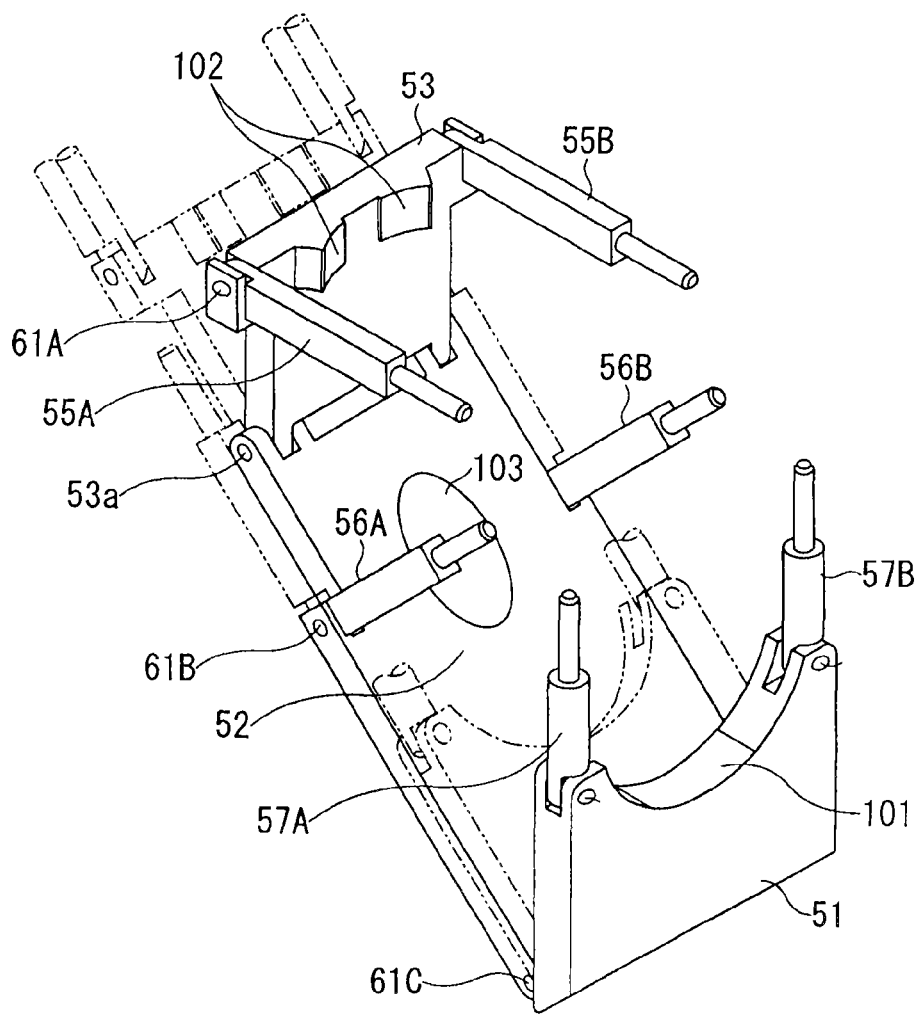
FIG. 4 is a perspective view showing a lower side clamp according to the first embodiment of the invention.

FIGS. 1 to 4 show the first embodiment of the present invention. FIG. 1 is a perspective view showing an overall structure and an installed state of a jet pump riser reinforcing apparatus according to the first embodiment of the present invention. FIGS. 2 and 3 are perspective views showing a structure of an elbow upper clamp of the jet pump riser reinforcing apparatus in different angles. FIG. 4 is a perspective view showing structures of an elbow lower clamping member, an elbow vertical portion clamping member, and an elbow horizontal portion clamping member.

As shown in FIG. 1, the riser reinforcing apparatus 50 of the present embodiment includes: an elbow upper clamp 54 for covering a riser elbow 11 from the upper side, the riser elbow 11 coupled to a thermal sleeve 12; an elbow lower portion clamp 52 as an elbow lower clamping member for clamping the riser elbow 11 from the lower side; a vertical portion clamp 53 as an elbow vertical portion clamping member for covering a vertical portion of an upper end of the riser elbow 11; a horizontal portion clamp 51 as an elbow horizontal portion clamping member for covering a horizontal portion of the riser elbow 11; and members for coupling the members mentioned above.

The riser elbow upper clamp 54 has a block-shaped integral structure substantially in a shape of a curved cylinder as shown in FIGS. 2 and 3. An outer peripheral side has a partial arc shape for covering the riser pipe 10, the riser elbow 11, and the thermal sleeve 12 which constitutes a portion 54a for covering the riser pipe and the like. An inner periphery of the riser elbow upper clamp 54 has a recessed shape like a split cylinder.

Further, opposite side portions of the riser elbow upper clamp 54 provide parallel surfaces and are formed with a plurality of bracket portions 54c, partially opened, to which fastening members such as bolts are locked. Inner surfaces of the brackets have an arc-shape, for example.

On the other hand, the elbow lower portion clamp 52, the vertical portion clamp 53, and the horizontal portion clamp 51 are respectively formed as plate-shaped members and integrally formed as an assembly of a plurality of plates which are assembled so as to be aligned and opened as shown in FIG. 4.

The elbow lower portion clamp 52 is a substantially rectangular plate-shaped body. One surface of the elbow lower portion clamp 52 functions as a cover surface for clamping the riser elbow 11 from the lower side and a circular recessed contact portion 103 to be brought into contact with the riser elbow 11 is formed at a central portion of this surface. In central positions of opposite sides in a direction of shorter sides of the elbow lower portion clamp 52, a pair of elbow portion bolts 56A, 56B are provided for turning through fulcrum pin 61B. These elbow bolts 56A, 56B are detachably locked to the bracket portions 54c of the elbow lower portion clamp 52.

The vertical portion clamp 53 is a plate-shaped member coupled for turning to one end in a longitudinal direction of the elbow lower portion clamp 52 through a fulcrum pin 53a and a pair of left and right contact portions 102 are provided in an arc-shaped arrangement to a turning end of the vertical portion clamp 53.

On left and right sides of the vertical portion clamp 53, a pair of vertical portion bolts 55A, 55B are provided for turning through a fulcrum pin 61A. These vertical portion bolts 55A, 55B are detachably locked to the bracket portions 54c of the elbow lower portion clamp 52.

The horizontal portion clamp 51 is a plate-shaped member coupled for turning to the other end in the longitudinal direction of the elbow lower portion clamp 52 through a fulcrum pin 61C. A contact portion 101 composed of an arc-shaped recessed portion is formed at a turning end of the horizontal portion clamp 51. On left and right sides of the horizontal portion clamp 51, a pair of horizontal portion bolts 57A, 57B are provided for turning through the fulcrum pin 61B. These horizontal portion bolts 57A, 57B are detachably locked to the bracket portions 54c of the elbow lower portion clamp 52.

In order to install the riser reinforcing apparatus 50, the elbow upper clamp 54 is lifted down from the upper side of the RPV 1 via the downcomer portion through the remote controlling, and the integrated elbow lower portion clamp 52, vertical portion clamp 53, and horizontal portion clamp 51 are lifted then down below the riser elbow 11. In this lifting-down operation, the elbow lower portion clamp 52, the vertical portion clamp 53, and the horizontal portion clamp 51 are treated in a form of one plate as shown in phantom lines in FIG. 4. In this way, it becomes possible to easily carry out the lifting-down operation even through the narrow space in the downcomer portion.

Then, after the lift-down operation, the elbow lower portion clamp 52, the vertical portion clamp 53, and the horizontal portion clamp 51 are opened as shown in solid lines in FIG. 4, the elbow lower portion clamp 52 is fastened to the elbow upper clamp 54 to cover the riser elbow 11 from the lower side, the vertical portion clamp 53 is fastened from a side of a vertical portion of the riser elbow 11, and the horizontal portion clamp 51 is fastened to the thermal sleeve 12 and a horizontal portion of the riser elbow 11 from the lower side through the respective tightening members, i.e., the bolts 55A, 55B, 56A, 56B, 57A, 57B, and the like.

As described above, the horizontal portion clamp 51 has the contact portion 101 of the shape fitting to an outer shape of the thermal sleeve 12. The clamp 51 is mounted to a vicinity of a weld line between the riser elbow 11 and the thermal sleeve 12 and fixed by a frictional force generated between the thermal sleeve 12 and the clamp 51 by tightening the horizontal portion bolts 57.

The horizontal portion clamp 51, the riser elbow lower portion clamp 52, and the vertical portion clamp 53 are coupled by fulcrum pins 61, and in addition, the vertical portion bolts 55, the riser elbow portion bolts 56 and the horizontal portion bolts 57 are reliably coupled to the respective clamps by the fulcrum pins 61.

In order to be fixed to the riser pipe 10, the riser elbow 11, and the thermal sleeve 12, it is necessary to avoid crown portions of the welded portion between the riser elbow 11 and the riser pipe 10 and the welded portion between the riser elbow 11 and the thermal sleeve 12. For this purpose, a contact portion 104 is formed to have a protruding structure as compared with a non-contact portion, or the riser elbow upper clamp 54 in the vicinity of the crown portion has an incision structure.

Furthermore, the respective parts or portions are made to be movable and can be lifted down into the reactor without interfering with the inside of the existing reactor and other structures and installed on the target portion. The vertical portion clamp 53 has the contact portions 102 in such shapes as to be fitted to an outer shape of the riser pipe 10. The clamp 53 is mounted to the vicinity of the weld line between the riser elbow 11 and the riser pipe 10 and fixed by the frictional force generated between the riser pipe 10 and the clamp 53 by tightening the vertical portion bolts 55.

In order to avoid the contact of the vertical portion clamp 53 with the crown portion of the welded portion between the riser elbow 11 and the riser pipe 10, the contact portions 102 are formed so as to protrude as compared with a non-contact portion.

As shown in FIG. 1, the riser elbow upper clamp 54 is in contact with an upper surface of the riser elbow 11 in such a manner as to cover and be fitted to the upper surface. The horizontal portion clamp 51, the riser elbow lower portion clamp 52, and the vertical portion clamp 53 are in contact with the horizontal portion of a lower surface side of the riser elbow 11, a curved lower surface of the riser elbow 11, the upper end of the riser elbow 11 and a vertical portion of a lower end of the riser pipe 10 in such manners as to be fitted to them, respectively.

The riser elbow lower portion clamp 52 has such a shape as to cover the lower portion side of the riser elbow 11. On the riser elbow 11 side of the riser elbow lower portion clamp 52, the incision 103 having such a shape as to be fitted to the outer shape of the riser elbow 11 is formed, for example, and the riser elbow 11 can be fitted in the incision 103. The riser reinforcing apparatus 50 is fixed by tightening the clamps with the vertical portion bolts 55 and the horizontal portion bolts 57 and by tightening the riser elbow portion bolts 56.

With such a clamp apparatus, the riser pipe 10, the riser elbow 11, and the thermal sleeve 12 can be retained and fixed, and the occurrence of the crack in the welded portion and the development of the occurring crack can be prevented. Moreover, even if the weld line between the riser elbow 11 and riser pipe 10 ruptures, it is possible to prevent the riser elbow 11 and the riser pipe 10 from separating and displacing from each other.

Furthermore, it is apparent that the same effects are obtainable when the weld line between the riser elbow 11 and the thermal sleeve 12 ruptures.

Figure 5:
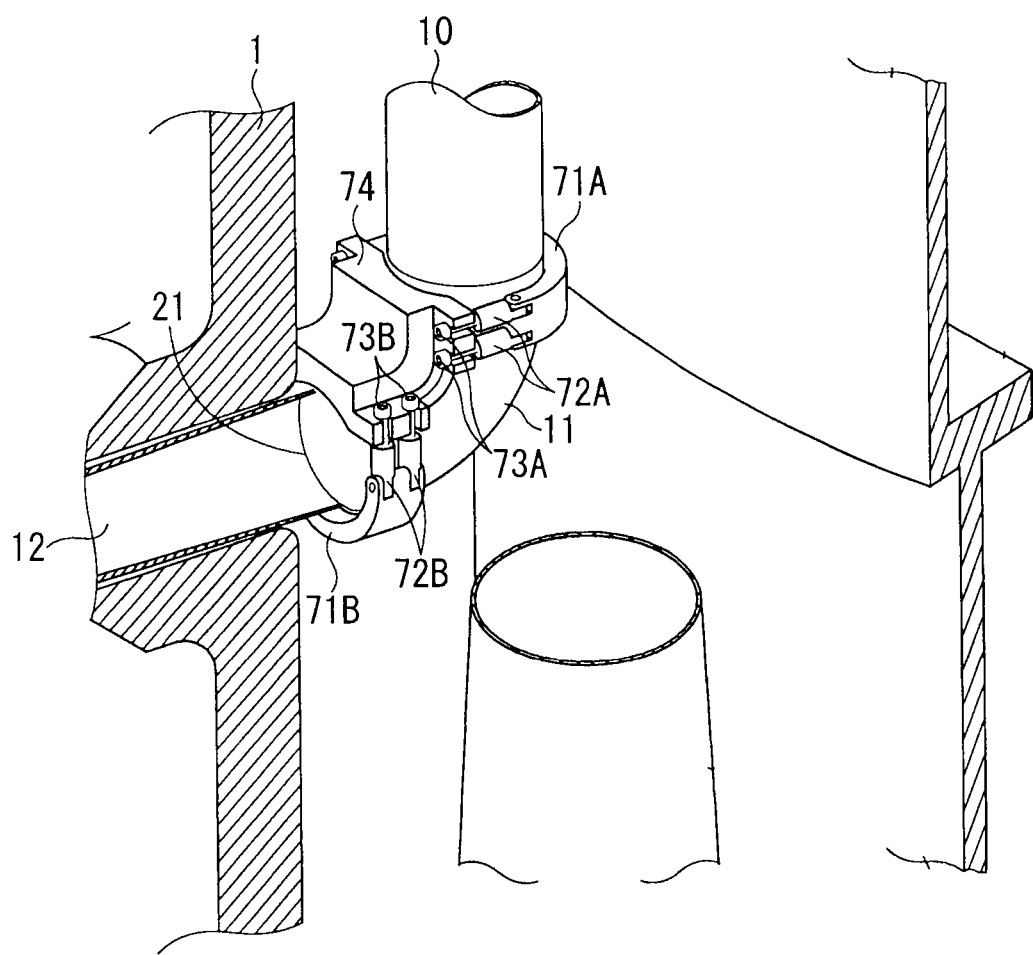
FIG. 5 is a perspective view showing a mounted state of a clamp according to a second embodiment of the invention.

Second Embodiment (FIG. 5)

FIG. 5 is a perspective view showing an installed state of a jet pump riser reinforcing apparatus according to a second embodiment of the present invention. In this embodiment, the jet pump riser reinforcing apparatus includes an elbow lower clamping member, an elbow vertical portion clamping member, and an elbow horizontal portion clamping member, which are formed as a plurality of U-shaped members separated from each other.

This second embodiment is different from the first embodiment in shapes of the clamps to be mounted to the jet pump riser 10a, shapes of contact portions of the riser elbow upper clamp with coupling bolts, and differs in that the riser elbow lower portion clamp is not used.

In other words, in the embodiment, the clamps have the U-shapes and include bases 71A, 71B having contact portions in such shapes as to be fitted to the outer shapes of the riser pipe 10, and also include the thermal sleeve 12, arms 72A, 72B one ends of which are supported to tip ends of the bases 71A, 71B through fulcrum pins to be opened and closed, and bolts 73A, 73B protruding from the other ends of the arms 72A, 72B.

The bolts 73A, 73B are detachably locked to the elbow upper clamp 74.

The bases 71A, 71B have a structure in which the two U-shaped members on the riser elbow 11 side and the riser pipe 10 side or the thermal sleeve 12 side are coupled together. The riser pipe 10, the riser elbow 11 and the thermal sleeve 12 are fixed by tightening the bolts 73A, 73B with the frictional force generated therebetween. Other structures are substantially similar to those of the first embodiment.

According to this second embodiment, because the riser elbow lower portion clamp is not used, the present invention is applicable to the jet pump on which a clamp for another purpose has already been installed. In the embodiment, operation and effects similar to those in the first embodiment will be obtainable.

Figure 6:
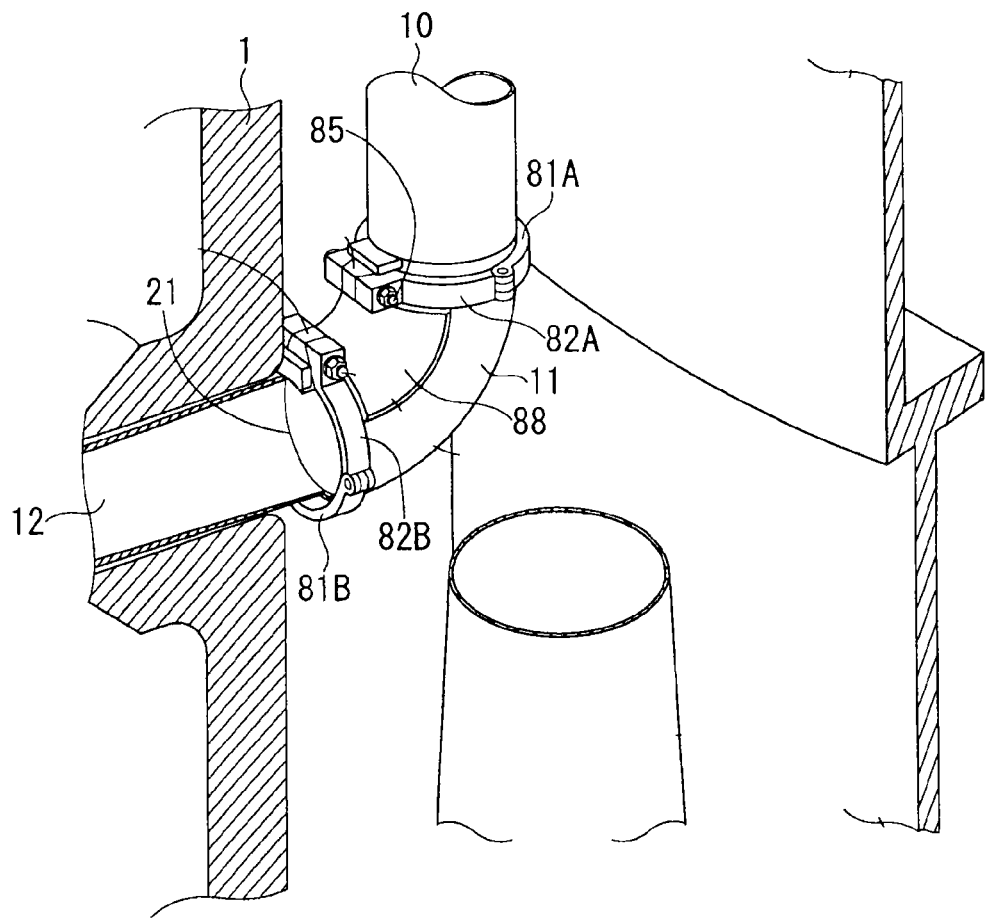
FIG. 6 is a perspective view showing a mounted state of a clamp according to a third embodiment of the invention.
Figure 7:
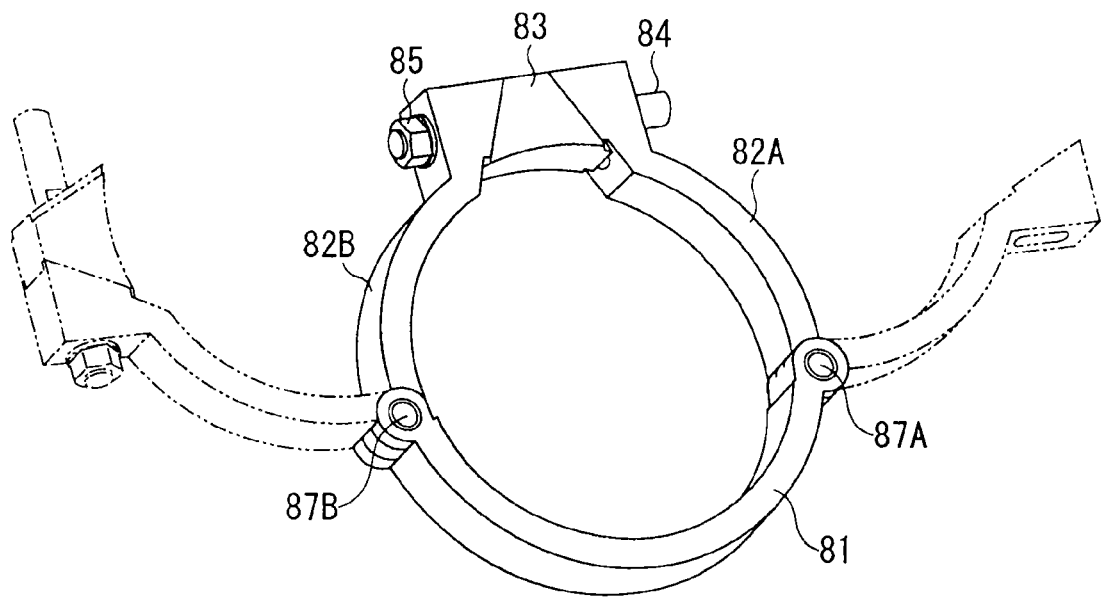
FIG. 7 is a perspective view showing assembly of the clamp used in the third embodiment of the invention.
Figure 8:
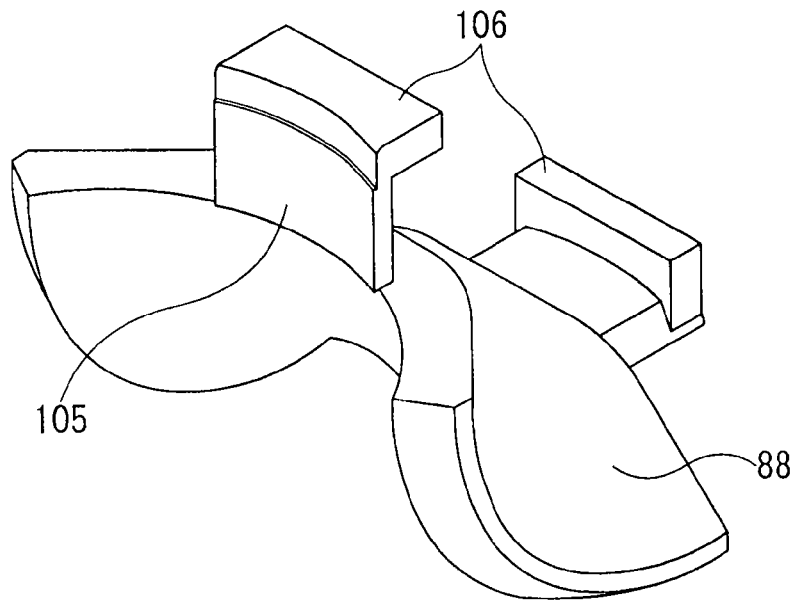
FIG. 8 is a perspective view showing a riser elbow upper clamp used in the third embodiment of the invention.

Third Embodiment (FIGS. 6 to 8)

FIGS. 6 to 8 show the third embodiment of the invention. FIG. 6 is a perspective view showing an installed state of a jet pump riser reinforcing apparatus according to a third embodiment of the present invention. FIG. 7 is a perspective view showing shapes of clamps. FIG. 8 is a perspective view showing an elbow upper clamp. In this third embodiment, a jet pump riser reinforcing apparatus includes the elbow lower clamping member, the elbow vertical portion clamping member, and the elbow horizontal portion clamping member, which are formed as a plurality of ring-shaped members separated from each other.

The embodiment is different from the first embodiment and the second embodiment in that the elbow upper clamp 88 to be mounted to the jet pump riser 10a is changed into a relatively simple structure.

In other words, as shown in FIGS. 6 and 7, the elbow upper clamp 88 of this embodiment has a structure in which a pair of clamp arms 82A, 82B having shapes of tightening bands are respectively mounted to clamp bases 81A, 81B by fulcrum pins 87A, 87B, the clamp bases 81A, 81B having thin contact portions in such simple shapes as to be fitted to the outer shapes of the riser pipe 10 and the thermal sleeve 12.

The respective fulcrum pins 87A, 87B are fixed to the clamp bases 81A, 81B or the clamp arms 82A, 82B by means of cooling fitting or the like.

To one of the clamp arms 82A, 82B, a wedge 83 is mounted by means of bolt 84 and nut 85.

The clamp is lowered into the reactor in an opened state (shown in two-dot chain lines) as shown in FIG. 7, mounted to the riser pipe 10 or the thermal sleeve 12, and the bolt 84 shown in FIG. 6 is mounted. By tightening the bolt 84, the wedge 83 is pushed through the riser elbow upper clamp 88 against the riser pipe 10 or the thermal sleeve 12 and are fixed by the generated frictional force.

As shown in FIG. 8, the riser elbow upper clamp 88 has a structure not to be displaced by providing shoulder portions 106 to contact portions 105 of the riser elbow upper clamp 88.

It is also possible to supplementarily form grooves having the same widths as the clamps in the riser elbow upper clamp 88 to thereby prevent positional displacement.

Further, it is necessary for the riser elbow upper clamp 88 to avoid the crown portions of the welded portion between the riser elbow 11 and the riser pipe 10 and the welded portion between the riser elbow 11 and the thermal sleeve 12. For this purpose, the contact portions 105 have protruding structures as compared with the non-contact portion, or incisions are formed in the vicinities of the crown portions, for example.

Since the other structures such as the structures of the welded portions 21, the structure of the horizontal clamp 51, the structure of the elbow upper clamp 52, and the structure of the vertical portion clamp 53 are substantially similar to those of the first embodiment, the like reference numerals are added to the structures in FIGS. 6 to 8 corresponding to those shown in FIGS. 1 to 4 and the descriptions thereof are omitted herein.

According to this embodiment, by selecting the proper dimension of the riser elbow upper clamp so as to cover the riser elbow 11, the apparatus can be applied to the jet pump, on which a clamp for another purpose has already been installed without using the riser elbow lower portion clamp as in the second embodiment. In the embodiment, the operation and the effects similar to those in the first embodiment are obtainable.

Figure 9:
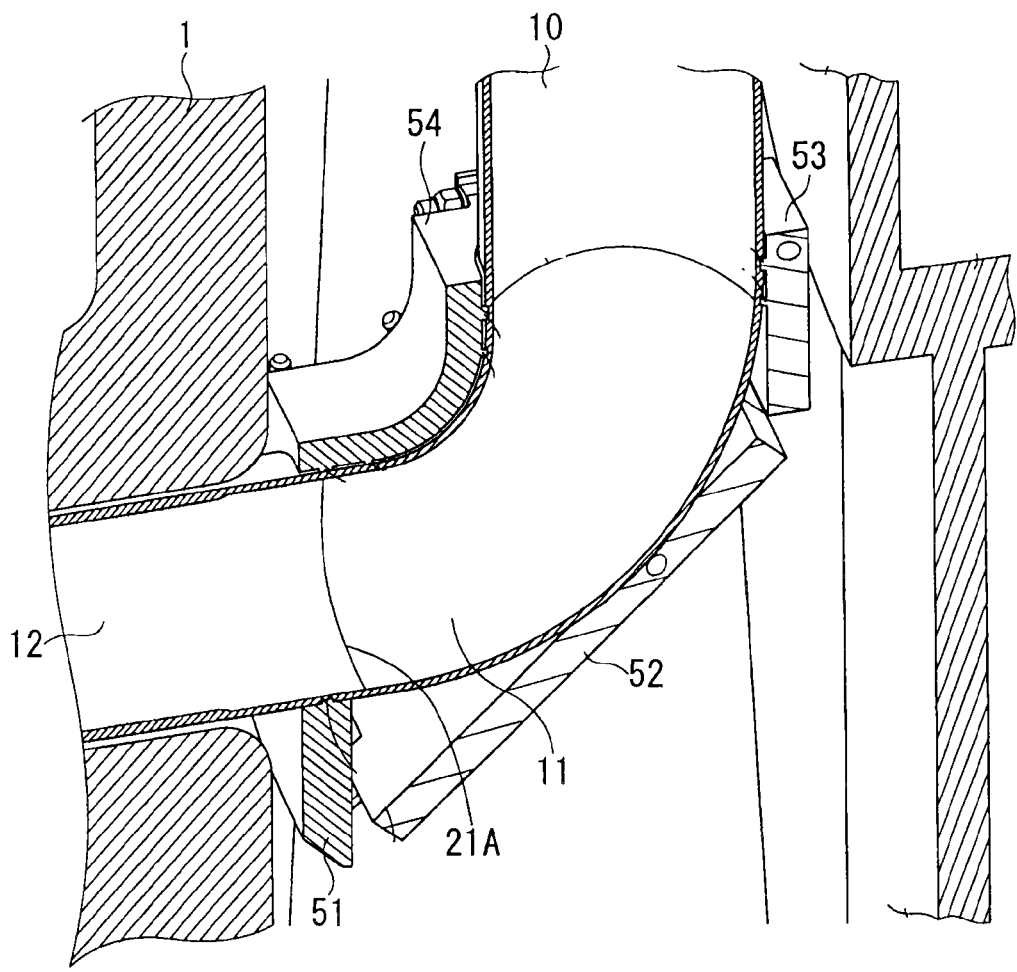
FIG. 9 is a perspective view showing a mounted state of a clamp on a riser elbow according to a fourth embodiment of the invention.
Figure 10:
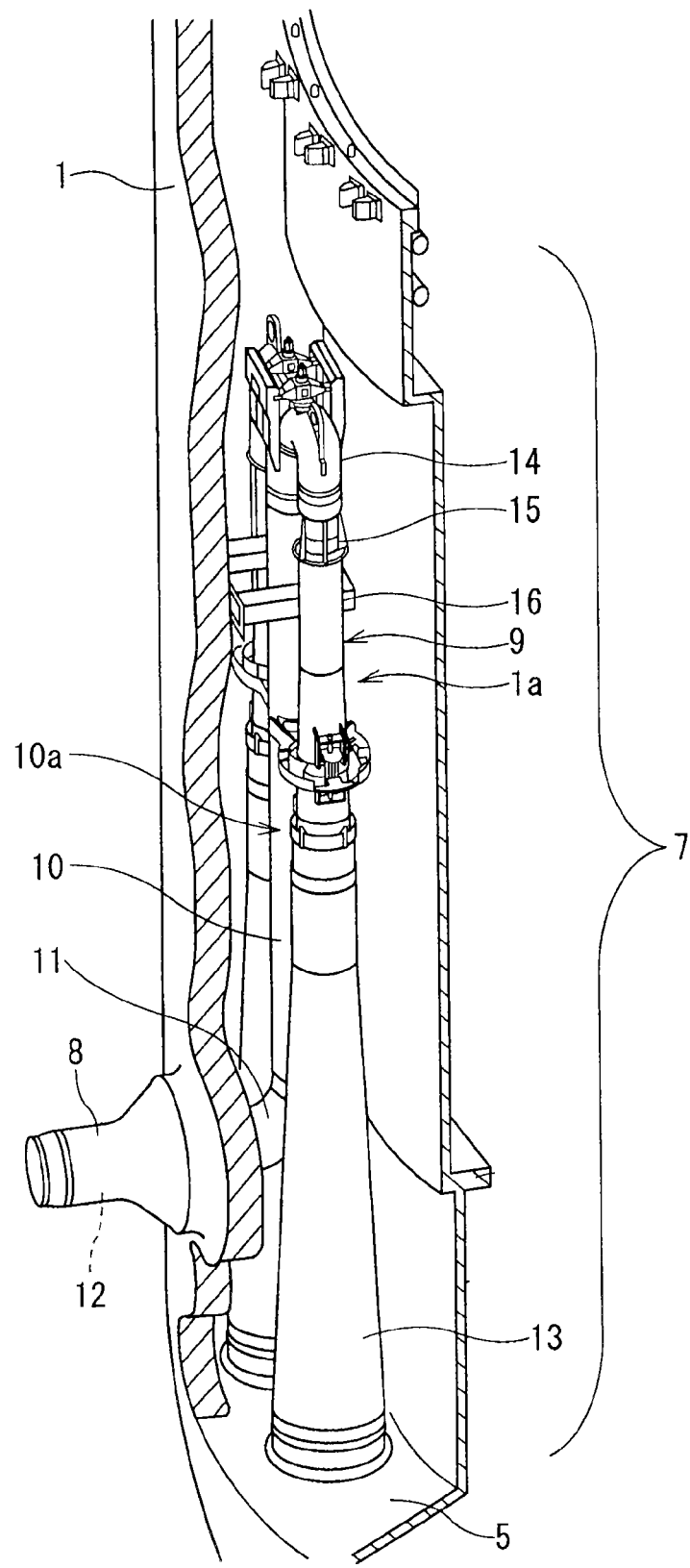
FIG. 10 is a perspective view showing a region surrounding a jet pump to which the invention is applied.

Fourth Embodiment (FIG. 9)

FIG. 9 is a view showing one example of an installed state of a jet pump riser reinforcing apparatus according to the fourth embodiment of the present invention. In this fourth embodiment, the jet pump riser reinforcing apparatus includes at least one of the elbow upper clamp, the elbow lower clamping member, the elbow vertical portion clamping member, and the elbow horizontal portion clamping member, and this one member has a movement restricting structure with respect to an outer peripheral surface of the riser elbow by the fitting of recessed and protruding portions.

The embodiment is different from the above-described first, second and third embodiments in that the recessed portions such as grooves are formed in outer peripheral surfaces of the riser pipe 10B, the riser elbow 11 and the thermal sleeve 12, and in that protruding portions 110A, 110B, and 110C are formed on the horizontal portion clamp 51 and are fitted in the recessed portions.

Since the other structures such as the structures of the welded portions 21A, 21B, the structure of the horizontal clamp 51, the structure of the elbow upper clamp 52, and the structure of the vertical portion clamp 53 are similar to those in the first embodiment, the like reference numerals are added to the structures in FIG. 9 corresponding to those in FIGS. 1 to 4, and the descriptions thereof are omitted herein.

According to this fourth embodiment, horizontal or vertical movements of the horizontal portion clamp 51, the elbow lower portion clamp 52, the vertical portion clamp 53, and the elbow upper clamp 54 can be restricted by fitting the protruding portions 110 of the respective clamps in the grooves in addition to the frictional force of clamping by the clamps.

According to this embodiment, in addition to the operation and effects similar to those in the above-descried respective embodiments, movements of the clamp on the outer peripheral surfaces of the riser elbow 11 and the thermal sleeve 12 can be restricted further reliably, and safeness in the installation can be further improved.

What is claimed is:

1. An apparatus for reinforcing a jet pump riser disposed in a reactor pressure vessel of a boiling water reactor, comprising:

an elbow upper clamp which is configured to cover an upper surface of a riser elbow of the jet pump riser and which riser elbow is coupled to a thermal sleeve from an upper side of the riser elbow, the elbow upper clamp includes a first portion which is configured to cover an upper surface of a first portion of the riser elbow, a central axis of the first portion of the riser elbow extending in a vertical direction, a second portion which is configured to cover an upper surface of a second portion of the riser elbow, a central axis of the second portion of the riser elbow extending in a horizontal direction, and a third portion which is configured to cover a curved upper surface of the riser elbow, the third portion is disposed between the first portion and the second portion;

an elbow lower clamping member which is configured to cover a curved lower surface of the riser elbow from a lower side of the riser elbow;

an elbow vertical portion clamping member which is configured to cover a lower surface of the first portion of the riser elbow; and an elbow horizontal portion clamping member which is configured to cover a lower surface of the second portion of the riser elbow, wherein a surface of the elbow upper clamp on a riser elbow side has a partially-circular arc shape substantially the same as the upper surface of the riser elbow, wherein the elbow lower clamping member cooperates with the third portion of the elbow upper clamp, the elbow vertical portion clamping member cooperates with the first portion of the elbow upper clamp, and the elbow horizontal portion clamping member cooperates with second portion of the elbow upper clamp so as to fix the thermal sleeve, the riser elbow and a riser pipe, and wherein the elbow lower clamping member is a substantially rectangular plate-shaped body with a circular recessed contact portion formed at a central portion of a cover surface of the plate-shaped body, a first end of the plate-shaped body of the elbow lower clamping member is pivotably connected to the elbow vertical portion clamping member and a second end of the plate-shaped body of the elbow lower clamping member is pivotably connected to the elbow horizontal portion clamping member so as to present a foldable structure.

2. The apparatus for reinforcing a jet pump riser according to claim 1, wherein the elbow lower clamping member, the elbow vertical portion clamping member, and the elbow horizontal portion clamping member each includes a plurality of clamping members.

3. The apparatus for reinforcing a jet pump riser according to claim 1, wherein the first end of the plate-shaped body of the elbow lower clamping member is pivotably connected to the elbow vertical portion clamping member through a pin.

4. The apparatus for reinforcing a jet pump riser according to claim 1, wherein the second end of the plate-shaped body of the elbow lower clamping member is pivotably connected to the elbow horizontal portion clamping member through a pin.

5. The apparatus for reinforcing a jet pump riser according to claim 1, wherein an incision is provided on a riser elbow side of the elbow lower clamping member such that the riser elbow can be fitted in the incision.

6. The apparatus for reinforcing a jet pump riser according to claim 1, wherein a surface of the elbow upper clamp opposite the riser elbow side presents a partial arc shape which is configured to cover the riser elbow.

7. The apparatus for reinforcing a jet pump riser according to claim 1, wherein the elbow upper clamp, the elbow lower clamping member, the elbow vertical portion clamping member, and the elbow horizontal portion clamping member are configured to cover and contact their respective surfaces of the riser elbow.

8. The apparatus for reinforcing a jet pump riser according to claim 1, wherein the elbow vertical portion clamping member includes a pair of vertical portion bolts on left and right sides thereof which turn through a fulcrum pin, the vertical portion bolts being detachably locked to bracket portions provided on the first portion of the elbow upper clamp.

9. The apparatus for reinforcing a jet pump riser according to claim 1, wherein the elbow horizontal portion clamping member includes a pair of horizontal portion bolts on left and right sides thereof which turn through a fulcrum pin, the horizontal portion bolts being detachably locked to bracket portions provided on the second portion of the elbow upper clamp.

10. The apparatus for reinforcing a jet pump riser according to claim 1, wherein the plate-shaped body of the elbow lower clamping member includes a pair of elbow portion bolts on left and right sides thereof which turn through a fulcrum pin, the elbow portion bolts being detachably locked to bracket portions provided on the third portion of the elbow upper clamp.

* * * * *